Jan. 29, 1952 N. G. KOPPINGER 2,583,857
GLARE SHIELD SUPPORT
Filed Oct. 22, 1945
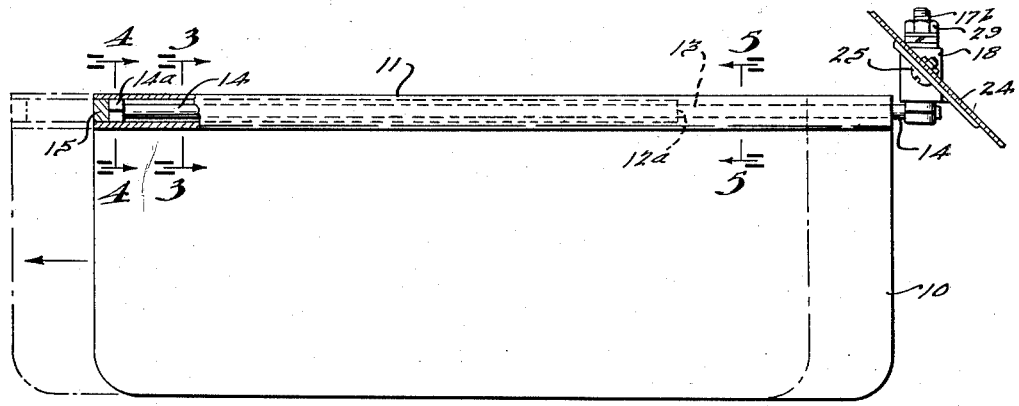
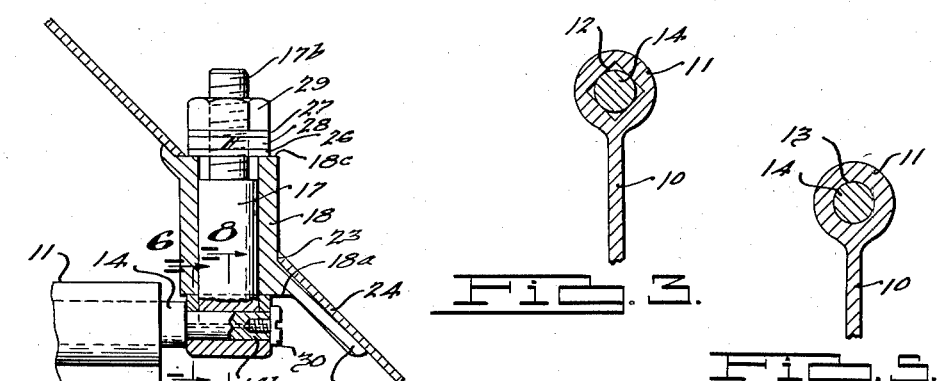
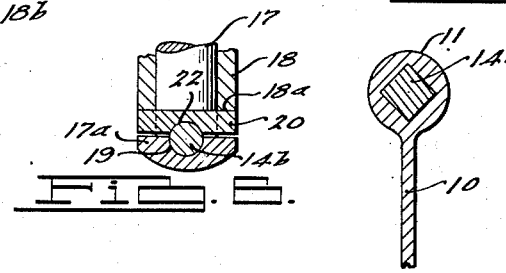
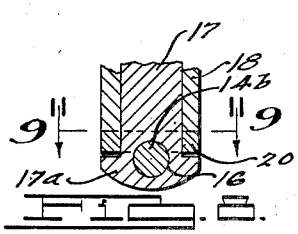
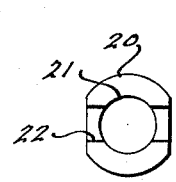
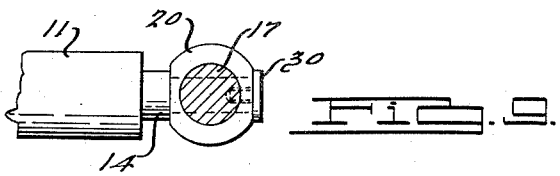
INVENTOR.
Nicholas G. Koppinger
BY
Gray + Smith
ATTORNEYS.

Patented Jan. 29, 1952

2,583,857

UNITED STATES PATENT OFFICE 2,583,857

GLARE SHIELD SUPPORT

Nicholas G. Koppinger, St. Clair Shores, Mich., assignor to Briggs Manufacturing Company, Detroit, Mich., a corporation of Michigan Application October 22, 1945, Serial No. 623,621

4 Claims. (Cl. 248—205)

This invention relates to glare shields or sun visors adapted to be mounted on the interior of automobile or other vehicle bodies above the windshields thereof for the purpose of shielding the front seat driver or passenger from the glare of the sun. The invention particularly relates to improvements in glare shields of the type adapted to be swung or rotated for adjustment both in a horizontal and in a vertical direction.

An object of the present invention is to provide an improved glare shield mounted to swing selectively in two directions about the axes of a horizontal supporting shaft or rod and a vertical shaft or stud, and in which a common means of simple and compact nature is provided for frictionally holding the shield in any adjusted position thereof.

A further object of the invention is to provide an improved mounting for a glare shield which will be efficient and durable in use and relatively inexpensive to manufacture, the improvements being characterized by the provision of a horizontal shaft or rod upon which the shield proper is non-rotatively mounted, a relatively short rotatable vertical shaft or stud upon which the shield supporting shaft or rod is rotatably mounted, and the further provision of improved means for frictionally holding both shafts in any positions of adjustment to which they are turned when adjusting the shield.

Another object of the invention is to improve and simplify the mounting of glare shields for use in the interior of automobile or other vehicle bodies, this being accomplished by mounting the shield proper for longitudinal adjustment along the length of a horizontal shaft or rod to which the shield is keyed or otherwise connected against relative turning motion, and supporting this shaft or rod for rotation upon a rotatable stud or the like while providing a simple and efficient means for frictionally holding the rod and stud in various positions of adjustment.

Other objects of this invention will appear in the following description and appended claims, reference being had to the accompanying drawings forming a part of this specification wherein like reference characters designate corresponding parts in the several views.

Fig. 1 is a side elevation, partly in section, illustrating a glare shield constructed in accordance with one embodiment of the invention.

Fig. 2 is an enlarged vertical section taken through the mounting for the glare shield proper.

Fig. 3 is an enlarged section taken substantially through lines 3—3 of Fig. 1 looking in the direction of the arrows.

Fig. 4 is an enlarged section taken substantially through lines 4—4 of Fig. 1 looking in the direction of the arrows.

Fig. 5 is an enlarged section taken substantially through lines 5—5 of Fig. 1 looking in the direction of the arrows.

Fig. 6 is an enlarged section taken substantially through lines 6—6 of Fig. 2 looking in the direction of the arrows.

Fig. 7 is a bottom plan view of the lower friction washer.

Fig. 8 is a section taken substantially through lines 8—8 of Fig. 2 looking in the direction of the arrows.

Fig. 9 is a section taken substantially through lines 9—9 of Fig. 8 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The present embodiment of the invention, illustrated in the drawings by way of example, comprises a glare shield proper 10 which may be formed of any suitable material. In the present instance the shield is molded from plastic material and is provided along the length of its upper edge with a longitudinal rounded boss or heavy bead 11. Extending the major distance through the boss or bead 11 from the outer end thereof is a hole or bore 12 which is square in cross-section. This square hole terminates at a point 12a, see Fig. 1, and from this point the boss or bead 11 is formed with a smaller diameter cylindrical hole 13 opening at the inner end of the boss. Extending through the holes 12 and 13 is a cylindrical supporting rod or shaft 14 which has a sliding fit within the hole 13 and which terminates at its outer end in a square head 14a having a sliding fit within the square bore or hole 12. The outer end of the hole 12 is closed by means of a plug 15. From the foregoing it will be seen that the shield 10 may be shifted along the length of the rod 14, as indicated in dotted lines in Fig. 1, in order to adjust the transverse position of the shield within the vehicle. The extreme limit of lateral adjustment of the shield is governed by the shoulder formed at point 12a which is engaged by the square head 14a at the outer terminal end of the supporting rod 14.

The rod or shaft 14 is provided at its inner end with a reduced portion 14b extending through a transverse hole 16 in the lower end of a vertical stud 17, the reduced portion 14b of the rod having a rotatable fit within the hole 16 in the stud. The stud 17 terminates at its lower end in an enlarged head 17a and thereabove is formed with a cylindrical shank having a bearing within the cylindrical barrel of a supporting bracket 18. The upper surface of the head 17a, which projects laterally beyond the cylindrical shank of the stud 17, is machined to provide diametrically opposed arcuate grooves 19 within which the reduced portion 14b of the supporting rod 14 fits, as illustrated in Fig. 6.

Interposed between the head 17a of the stud and the lower edge 18a of the bracket 18 is a friction washer 20 which, as shown in Fig. 7, is shaped in accordance with the shape of the head 17a. This friction washer 20 has a hole 21 to receive the cylindrical shank of the stud 17 and at opposite sides of this hole the washer is machined to provide arcuate grooves 22 similar to the grooves 19 in the head 17a but arranged in opposed relation thereto. When the friction washer 20 is mounted in the manner shown in Fig. 6, the reduced portion 14b of the supporting rod 14 fits within the grooves 22 in the friction washer 20 as well as the grooves 19 in the head 17a.

The bracket 18 may be mounted in the manner illustrated in Figs. 1 and 2 with the upper portion thereof projecting through a hole or aperture 23 in the windshield header 24 of the vehicle body. The bracket is provided with flanging 18b engaging the inner surface of the header panel and is secured thereto by means of screws 25. The upper end of the stud 17 is formed with a reduced threaded extension 17b upon which is mounted a friction washer 26 contacting the upper end 18c of the bracket 18. Also mounted upon the threaded end of the stud 17 is a lock washer 28 and a washer 27 which is interposed between the lock washer and an adjusting nut 29 threaded onto the end of the stud. After assembly of the shield 10 and rod 14 and after the inner end of the rod has been passed through the hole 16 a drive screw 30 may be secured to the end of the rod to hold the assembly in position.

By tightening the adjusting nut 29 the stud 17 will be drawn up so as to frictionally clamp the reduced portion 14b of the shield supporting rod 14 between the arcuate surfaces of the grooves 19 and 22. This clamping action against the reduced end 14b of the rod will be sufficient to grip the rod firmly and hold it in any position to which the rod is turned by swinging the shield 10 upwardly or downwardly in order to adjust its position. In addition to the gripping or clamping action exerted on the rod extension 14b, as above described, the friction washer 20 will be drawn up into frictional engagement with the end 18a of the bracket 18 when the nut 29 is tightened on the end of the stud 17. At the same time the friction washer 26 will be forced down into frictional engagement with the upper end 18c of the bracket. Thus, the washers 26 and 20 by their contact with the upper and lower ends of the bracket 18 will frictionally resist turning motion of the stud 17 within the barrel of the bracket 18 and this frictional resistance or gripping action will be sufficient to hold the stud 17 in any angular position to which it is turned by swinging the glare shield 10 in a horizontal direction.

From the foregoing it will be seen that the shield 10 is mounted so as to permit adjustment in three directions. The shield may be shifted in a rectilinear direction along the length of the supporting rod 14 to any desired position of adjustment and will be frictionally held in any such adjusted position by the frictional engagement of the head 14a of the rod within the square bore 12. In addition, the shield 10 may be grasped and swung in an up and down direction thereby rotating the reduced end 14b of the rod 14 within the frictional bearing formed by the opposed arcuate grooves 19 and 22 in the head 17a and the friction washer 20. The gripping action exerted by these parts on the portion 14b of the rod will result in holding the shield in any position to which it is swung in a vertical direction. Also, it will be seen that the shield 10 may be grasped and swung laterally or in a generally horizontal direction, thus turning the stud 17 within the barrel of the bracket 18. This motion of the stud will be resisted by the frictional engagement of the washers 20 and 26 with the opposite ends 18a and 18c of the bracket and this resistance will be adequate to hold the shield in any laterally adjusted position.

It is important to note from the foregoing described construction that the glare shield 10 is mounted so as to swing selectively in two directions about the axes of the rod 14 and the stud 17, and that by mounting the supporting rod 14 so as to rotate within the stud, which in turn is rotatably mounted within the fixed supporting bracket 18, a common means under the control of the adjusting nut 29 may be provided for frictionally resisting rotative movement of the rod and stud so as to releasably hold them against free turning movement after the shield 10 has been swung in one direction or the other to the desired adjusted position.

I claim:

1. A glare shield structure, comprising a bracket, a stud mounted to turn in said bracket about a generally vertical axis and terminating in an enlarged head disposed below the bracket and provided with a transverse hole, a shield supporting rod having one end rotatably supported in said hole, a friction washer lying between said head and the end of the bracket and having a hole through which said stud extends and being frictionally engageable at its upper side with said end of said bracket, said head and washer having opposed arcuate portions embracing opposite sides of the rod and frictionally engageable therewith, and means for axially adjusting said stud to vary the frictional engagement of said portions with said rod and the frictional engagement of said washer with said bracket.

2. A glare shield structure, comprising a bracket, a stud mounted to turn in said bracket about a longitudinal axis and having an enlarged head disposed below the bracket and provided with a transverse hole, a shield supporting rod having one end rotatably supported in said hole, a friction washer substantially coextensive with said head lying between said head and the end of said bracket and frictionally engaging the bracket, said head and washer having opposed recessed portions embracing said rod and frictionally engaging opposite sides thereof, and means for adjusting said stud axially.

3. A glare shield structure, comprising a bracket having a cylindrical bearing, a stud having a cylindrical shank rotatable in said bearing and terminating in an enlarged head spaced below said bracket and provided with a transverse hole, a shield supporting rod having one end extending through said hole and rotatable therein, a friction washer having a hole through which said shank extends and disposed between said enlarged head and the end of the bracket and frictionally engageable with said end, said washer and head having opposed arcuate recessed portions cooperable to frictionally embrace said rod, and means for drawing said shank axially within said bearing to vary the frictional engagement between said portions and rod and between said washer and bracket.

4. A glare shield structure, comprising a bracket, a stud mounted to turn in said bracket about a longitudinal axis and having an enlarged head disposed below the bracket and provided with a transverse hole, a shield supporting rod having one end rotatably supported in said hole, a friction washer lying between said head and the end of said bracket and frictionally engaging the bracket, said head and washer having opposed recessed portions embracing said rod and frictionally engaging opposite sides thereof, and means for adjusting said stud axially.

NICHOLAS G. KOPPINGER.

REFERENCES CITED

The following references are of record in the file of this patent:

UNITED STATES PATENTS

| Number | Name | Date |
|---|---|---|
| 2,095,715 | Rhein | Oct. 12, 1937 |
| 2,207,668 | Hudgings, Jr. | July 9, 1940 |
| 2,279,648 | Westrope | Apr. 14, 1942 |
| 2,294,317 | Pelcher et al. | Aug. 25, 1942 |
| 2,305,584 | Arbron | Dec. 22, 1942 |
| 2,360,193 | Westrope | Oct. 10, 1944 |
| 2,454,613 | Peltier et al. | Nov. 23, 1948 |